United States Patent [19]
Aizawa

[11] Patent Number: 5,724,170
[45] Date of Patent: Mar. 3, 1998

[54] AUTOMATIC POWER CONTROL CIRCUIT

[75] Inventor: Yukio Aizawa, Tokyo, Japan

[73] Assignee: NEC Corporation, Tokyo, Japan

[21] Appl. No.: 573,147

[22] Filed: Dec. 15, 1995

[30] Foreign Application Priority Data

Dec. 15, 1994 [JP] Japan ................... 6-333374

[51] Int. Cl.⁶ .................................................. H04B 10/04
[52] U.S. Cl. .............................. 359/187; 372/29; 372/38
[58] Field of Search ........................... 359/187, 177, 359/194; 372/29, 31–32, 38

[56] References Cited

U.S. PATENT DOCUMENTS

| | | | |
|---|---|---|---|
| 4,611,352 | 9/1986 | Fujuto et al. | 359/187 |
| 4,768,198 | 8/1988 | Deki | 372/38 |
| 5,146,464 | 9/1992 | Uemura | 372/38 |

OTHER PUBLICATIONS

Ueno et al., Technical draft of Conference, B–984, P4–122, of The Institute of Electronics, Information and Communication Engineers, Spring 1993.

*Primary Examiner*—Kinfe-Michael Negash
*Attorney, Agent, or Firm*—Scully, Scott, Murphy & Presser

[57] ABSTRACT

A control circuit of a light-emitting device comprises a negative-feedback loop including a photodetector and a sample and hold circuit. The photodetector monitors an optical signal emitted by the light-emitting device and the sample and hold circuit generates a control signal supplied to a light-emitting device driver. The sample and hold circuit performs the sampling of a monitored signal each time the light-emitting device emits light and holds the sampled monitored signal. The voltage held in the sample and hold circuit is output as the control signal the light-emitting device driver. The light-emitting device driver drives the light-emitting device to switch on and off according to the input digital data with the output light intensity of the light-emitting device controlled by the control signal so as to be kept at a constant level.

19 Claims, 6 Drawing Sheets

AUTOMATIC POWER CONTROL CIRCUIT

BACKGROUND OF THE INVENTION

1. Field of the Invention

The present invention generally relates to an automatic power control (APC) circuit, and in particular to an APC circuit for controlling an output light intensity of a light-emitting source.

2. Description of the Related Art

With the increased transmission rate of an optical transmission system, a high-speed APC circuit is desired more and more, especially in cases where burst signals having a very short frame length are converted into optical signals by the light-emitting source.

As an example of such a high-speed APC circuit, a LD driver circuit for Passive Double Star has been proposed by Ueno et al. (Technical draft of Conference, B-984, P4-122, of The Institute of Electronics, Information and Communication Engineers, Spring 1993). The LD driver circuit incorporates a laser diode LD as well as a photodiode PD for monitoring the intensity of laser light emitted by the laser diode LD. After the monitor current output of the photodiode PD is converted into a monitor voltage signal, the peak of the monitor voltage signal is detected by a peak detector. The peak voltage is used as a driver control signal by which the laser diode LD is controlled so as to emit a constant intensity of laser light. In other words, the LD driver circuit employs a light-intensity feedback loop where the peak detector is provided to detect the peak voltage indicative of the laser light intensity which is used as the feedback control voltage.

Generally, the peak detector is provided with a feedback loop together with a relatively large capacitive load. More specifically, referring to FIG. 6, the output of an operational amplifier OP is connected to the capacitor C for retaining the peak voltage through a transistor Tr. The retained voltage across the capacitor C is fed back to the input terminal of the operational amplifier OP so as to compare the monitor voltage signal with the retained voltage of the capacitor C. In this manner, the peak voltage is stored in the capacitor C.

However, since the peak detector incorporates the operational amplifier forming a feedback loop, careful consideration must be given to oscillation, ringing and overshoot, resulting in a complicated circuit arrangement. Further, the large capacitance load is needed to retain the peak voltage for a relatively long time, resulting in the capacitor C increasing in size.

Furthermore, the LD driver circuit has a double-feedback loop configuration consisting of a light-intensity feedback loop and a peak-detection feedback loop. Such a double-feedback loop causes the response to changes in output light intensities to becomes slow.

SUMMARY OF THE INVENTION

An object of the present invention is to provide a control system of a light-emitting source which achieves a high-speed response to changes in light intensities with the reduced power consumption and the simple circuit arrangement.

Another object of the present invention is to provide an APC circuit which can reduce the size and the power consumption and further reduce the time required for the output light intensity of the light-emitting source to reach a predetermined constant level.

A control system according to the present invention is comprised of a sampling circuit and a retaining circuit for generating a control signal supplied to a light-emitting source driver. The sampling circuit performs the sampling of a monitored signal each time the light-emitting source emits the light and the retaining circuit performs the holding of the voltage sampled by the sampling circuit. The retained voltage is output as the control signal from the retaining circuit to the driver. Receiving the control signal from the retaining circuit, the light-emitting source driver drives the light-emitting source to switch on and off according to the input digital data with the output light intensity of the light-emitting source set at a constant level according to the driver control signal. Since the sampling circuit and the retaining circuit have no feedback loop, the control system comprises only one negative-feedback loop of the light intensity.

According to another aspect of the present invention, a control system has a light-intensity negative feedback loop comprising a photodetector, a negative feedback amplifier, a sampling circuit and a retaining circuit. The control system further has a switch controller for controlling the sampling circuit so as to switch on each time the light-emitting source emits the light. If a substantial delay exists in the light-intensity negative feedback loop, the light-emitting source and its driver, a delay element may be provided to the switch controller so as to cancel out the substantial delay.

Preferably, the sampling circuit and the retaining circuit may be formed with a sample and hold circuit as known well. More specifically, the sample and hold circuit comprises an input buffer amplifier, a switching transistor, a capacitor and an output buffer amplifier. The monitored signal is stored into the capacitor when the switching transistor is forced into conduction. The stored voltage of the capacitor is output as the control signal to the light-emitting source driver through the output buffer amplifier.

The light-emitting source driver is preferably comprised of two drive transistors connected in series wherein the control terminals of the drive transistors receive the input digital data and the control signal, respectively. The control signal causes one of the drive transistors to vary in impedance and the input digital data causes the other drive transistor to switch on and off. Therefore, the light-emitting source driver outputs the driving current of a level determined by the control signal to the light-emitting source with the driving current switching on and off according to the input digital data.

DETAILED DESCRIPTION OF THE PREFERRED EMBODIMENTS

Figure 1:
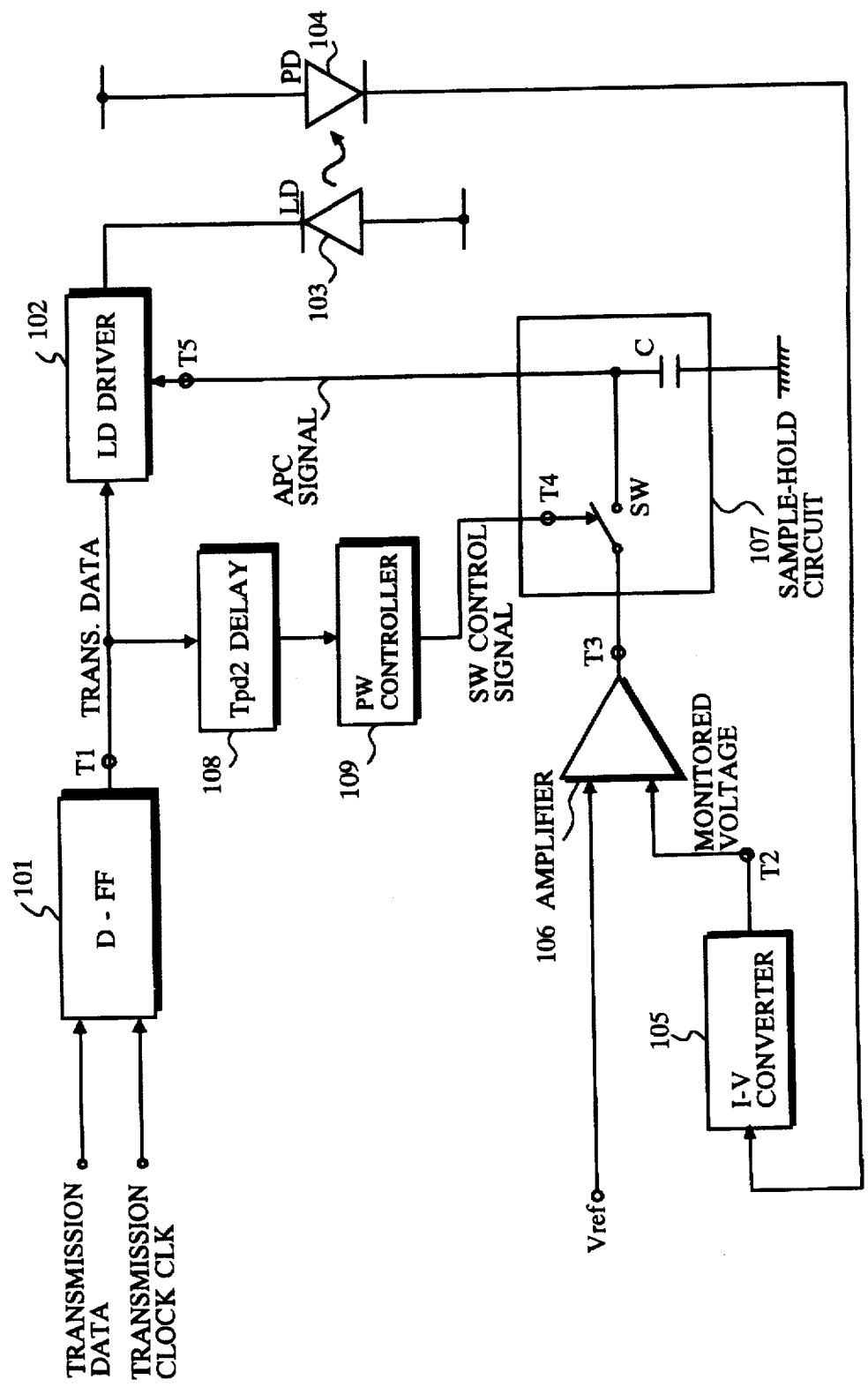
FIG. 1 is a block diagram showing the circuit arrangement of an APC circuit according to an embodiment of the present invention.

Referring to FIG. 1, the APC circuit according to a first embodiment of the present invention receives transmission data and clock from a data processing system (not shown) and outputs an optical signal corresponding to the transmission data to the transmission medium such as an optical fiber.

The transmission data and clock are received by a D-type flip-flop circuit 101 which performs the wave-shaping of the transmission data. The transmission data wave-shaped by the D-type flip-flop circuit 101 is output to a LD driver 102 which drives a laser diode 103 to emit the optical signal according to the transmission data and a APC signal.

The optical signal emitted by the laser diode 103 is monitored by a photodiode 104 which converts the emitted optical signal into an electric signal. In other words, the photodiode 104 converts the optical signal into the corresponding current signal in this case. Subsequently, the current signal monitored by the photodiode 104 is converted into a corresponding voltage signal by a current-to-voltage (I–V) converter 105. The output of the I–V converter 105 is amplified by an amplifier 106 and then is input to a sample and hold circuit 107. The amplifier 106 serves as a feedback amplifier in this circuit. The sample and hold circuit 107 is comprised of a sampling switch SW and a capacitor C which perform the sampling and holding of the monitored voltage signal received from the amplifier 106 in accordance with a SW control signal. The voltage signal retained in the capacitor of the sample and hold circuit 107 is output as an APC signal to the LD driver 102.

The SW control signal is generated by a delay circuit 108 and a pulse width controller 109. The delay circuit 108 delays the transmission data by a predetermined period Tpd2 which is the time period required for a signal corresponding to the transmission data on the node T1 to reach the sample and hold circuit 107 or the node T3 via the photodiode 104. In response to the delayed transmission data received from the delay circuit 108, the pulse width controller 109 generates the SW control signal having a predetermined pulse width which is shorter than the pulse width of the transmission data by a predetermined period. In other words, the duty ratio of the SW control signal is smaller than that of the delayed transmission data by a predetermined amount. More specifically, as described in detail later, the SW control signal goes high when a pulse of the transmission data goes high, continues to be high during the predetermined pulse width, and then goes low before the pulse of the transmission data goes low.

In this embodiment, when the SW control signal goes high, the sampling switch SW is forced into conduction and the monitored voltage signal corresponding to the light emitted by the laser diode 103 appears on the node T3. Therefore, the monitored voltage signal on the node T3 passes through the sampling switch SW and is stored into the capacitor C when the SW control signal is high.

Figure 2:
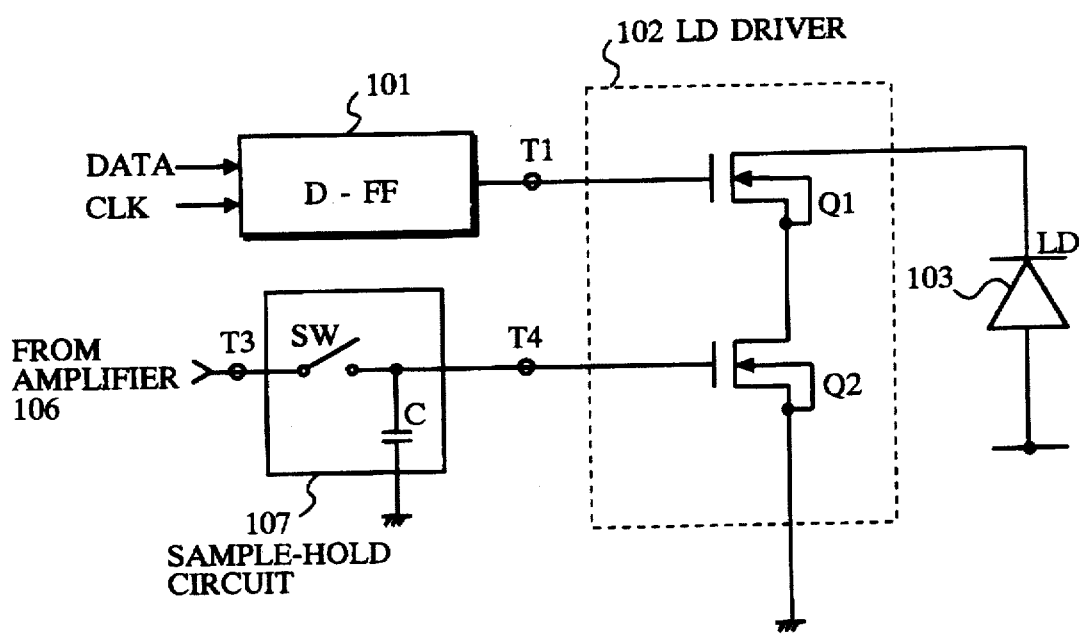
FIG. 2 is a circuit diagram showing the LD driver of the embodiment as shown in FIG. 1.

As shown in FIG. 2, the LD driver 102 is comprised of drive transistors Q1 and Q2 which are connected in series. The drive transistor Q1 receives the transmission data at the gate thereof from the D-type flip-flop circuit 101 and switches on and off according to a pulse string of the transmission data. The drive transistor Q2 receives the APC signal at the gate thereof from the sample and hold circuit 107 and varies in impedance according to the voltage of the APC signal. The laser diode 103 and the drive transistors Q1 and Q2 are connected in series, across which the power supply voltage is applied. Therefore, the light emitted from the laser diode 103 switches on and off according to a pulse stream of the transmission data and the light intensity varies in accordance with the voltage of the APC signal.

For example, when the APC signal increases in voltage, the drive transistor Q2 increases in impedance, resulting in the reduced drive current flowing the laser diode 103. Conversely, as the APC signal decreases in voltage, the drive transistor Q2 decreases in impedance, resulting in the increased drive current flowing the laser diode 103. In this manner, the intensity of light emitted by the laser diode 103 is adjusted by the APC signal.

Figure 3:
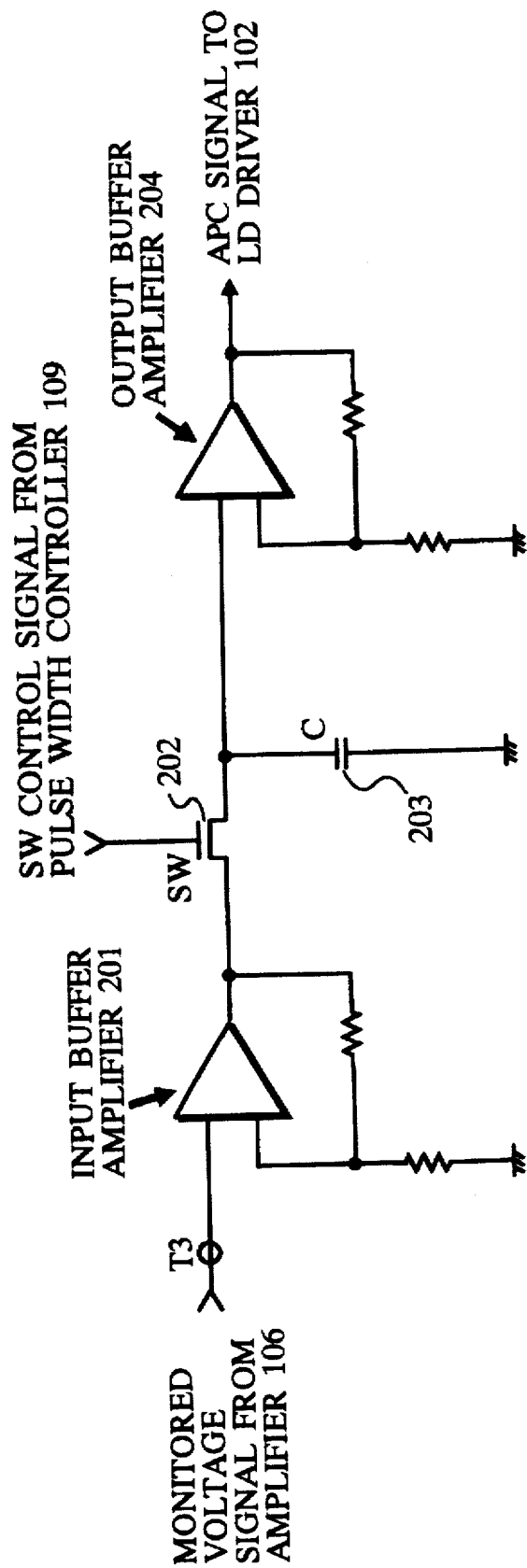
FIG. 3 is a detailed circuit diagram showing the sample and hold circuit of the embodiment as shown in FIG. 1.

Referring to FIG. 3, the sample and hold circuit 107 is comprised of an input buffer amplifier 201, a switching transistor 202, a capacitor 203 and an output buffer amplifier 204. The output terminal of the input buffer amplifier 201 is connected to the input terminal of the output buffer amplifier 204 through the switching transistor 202. The capacitor 203 is connected to the input terminal of the output buffer amplifier 204. When the SW control signal received from the pulse width controller 109 goes high, the switching transistor 202 is forced into conduction. Therefore, the monitored voltage signal received from the amplifier 106 is stored into the capacitor 203 through the switching transistor 202. When the SW control signal goes low, the switching transistor 202 switches off, causing the capacitor 203 to be isolated from the monitored voltage signal. Therefore, the stored voltage remains in the capacitor 203 until a subsequent pulse of the SW control signal is received, and the voltage stored in the capacitor 203 is output as the APC signal to the LD driver 102 through the output buffer amplifier 204. It is apparent from the above description that the sample and hold circuit has no feedback loop.

An operation of the APC circuit as shown in FIG. 1 will be described hereinafter.

Figure 4:
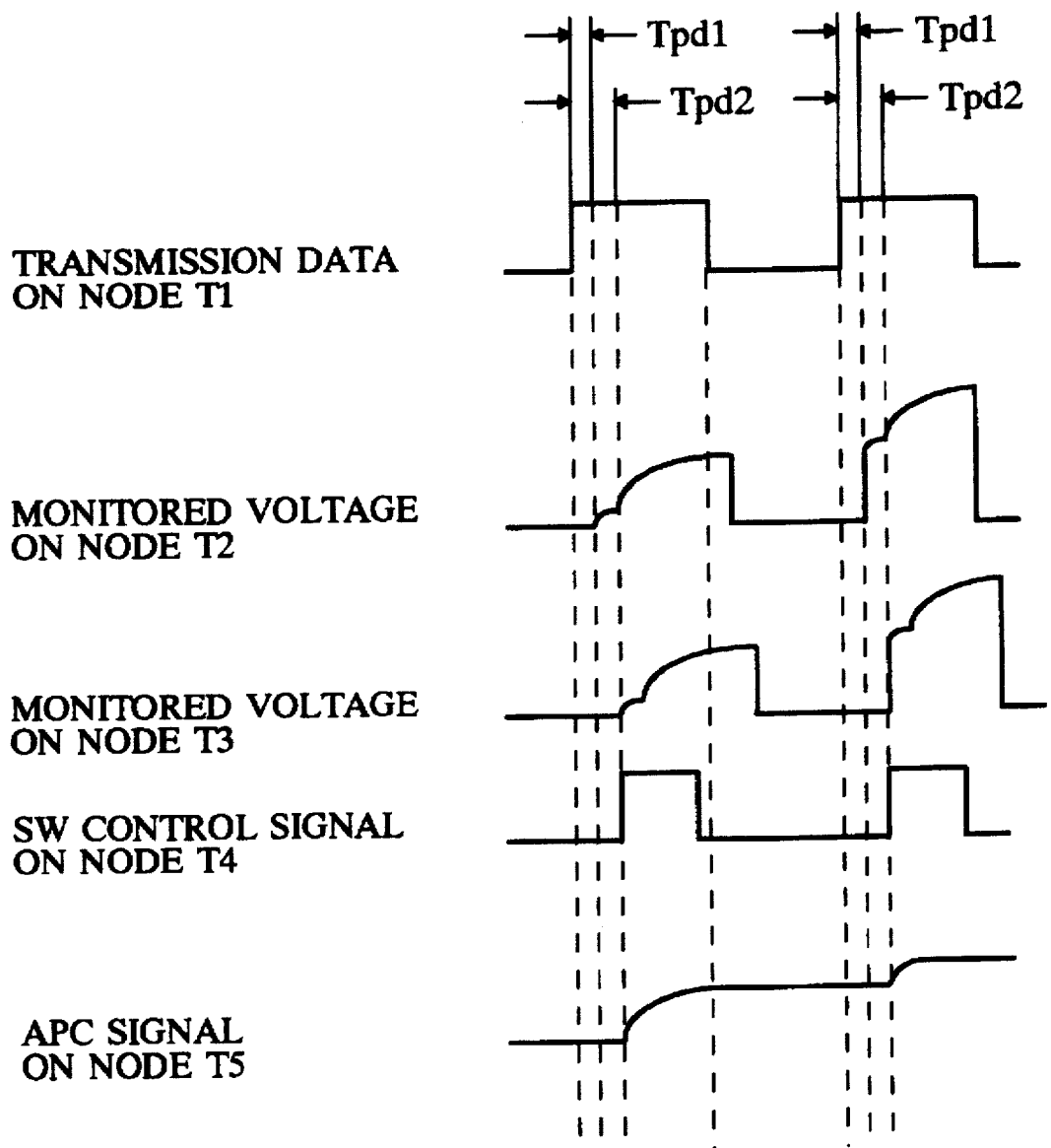
FIG. 4 is a waveform chart showing an operation of the embodiment as shown in FIG. 1.

Referring to FIG. 4, it is assumed that the transmission data wave-shaped by the D-type flip-flop circuit 101 appears at the node T1. The optical signal corresponding to the transmission data is emitted by the laser diode 103 and at the same time the optical signal is monitored by the photodiode 104. The monitored current signal is converted into the corresponding monitored voltage signal by the I–V converter 105 and then is amplified by the amplifier 106. In this embodiment, a delay time Tpd1 is generated by a part of the feedback loop from the node T1 to the node T2 via the photodiode 104, and a delay time Tpd2 is generated by a part of the feedback loop from the node T1 to the node T3 via the photodiode 104. Therefore, the monitored voltage signal on the node T2 starts rising after a lapse of the delay time Tpd1 since a pulse of the transmission data rises on the node T1. Similarly, the monitored voltage signal on the node T3 starts rising after a lapse of the delay time Tpd2. Since the delay circuit 108 delays the pulse of the transmission data by the time period Tpd2, the SW control signal on the node T4 goes high when the monitored voltage signal becomes active on the node T3. The SW control signal goes low before the monitored voltage signal goes low on the node T3. Therefore, the switching of the sampling switch SW allows only the monitored voltage signal corresponding to the intensity of light emitted by the laser diode 103 to be stored into the capacitor C. As a result, the APC signal is kept at a voltage which is stored into the capacitor C when the sampling switch SW switches on. In other words, the APC signal varies according to the intensity of light emitted by the laser diode 103 each time the sampling switch SW switches on.

The monitored voltage signal corresponds positively or negatively to the output light intensity of the laser diode 103 depending on the setting of the amplifier 106. In this embodiment, the monitored voltage signal on the node T3 corresponds positively to the output light intensity of the laser diode 103. More specifically, the monitored voltage signal on the node T3 decreases in voltage as the output light of the laser diode 103 decreases in intensity and the monitored voltage signal increases in voltage as the output light increases in intensity. As described above, the LD driver 102 outputs the increased drive current to the laser diode 103 when the APC signal decreases in voltage and outputs the reduced drive current when the APC signal increases in voltage.

Figure 5:
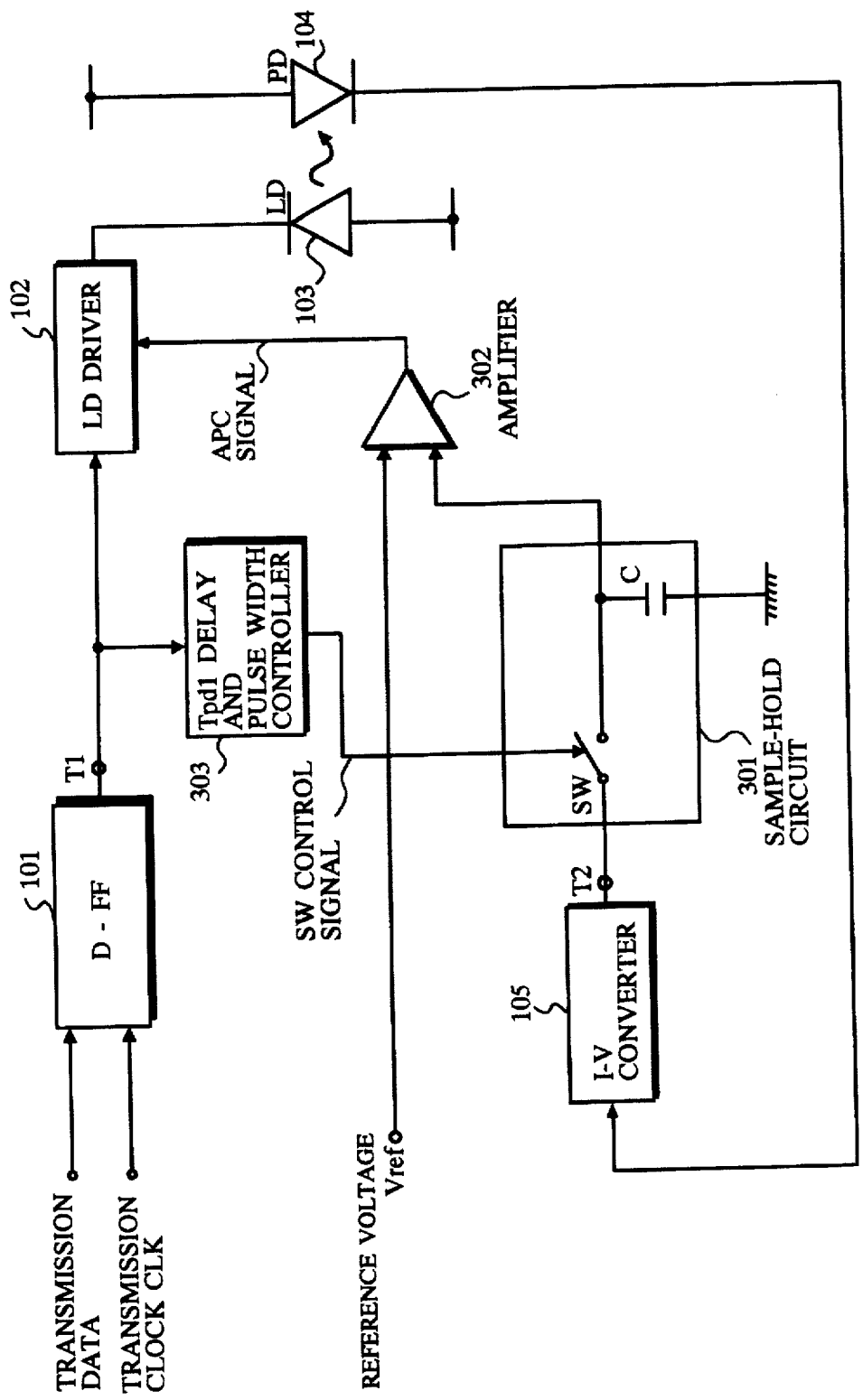
FIG. 5 is a block diagram showing the circuit arrangement of an APC circuit according to another embodiment of the present invention.
Figure 6:
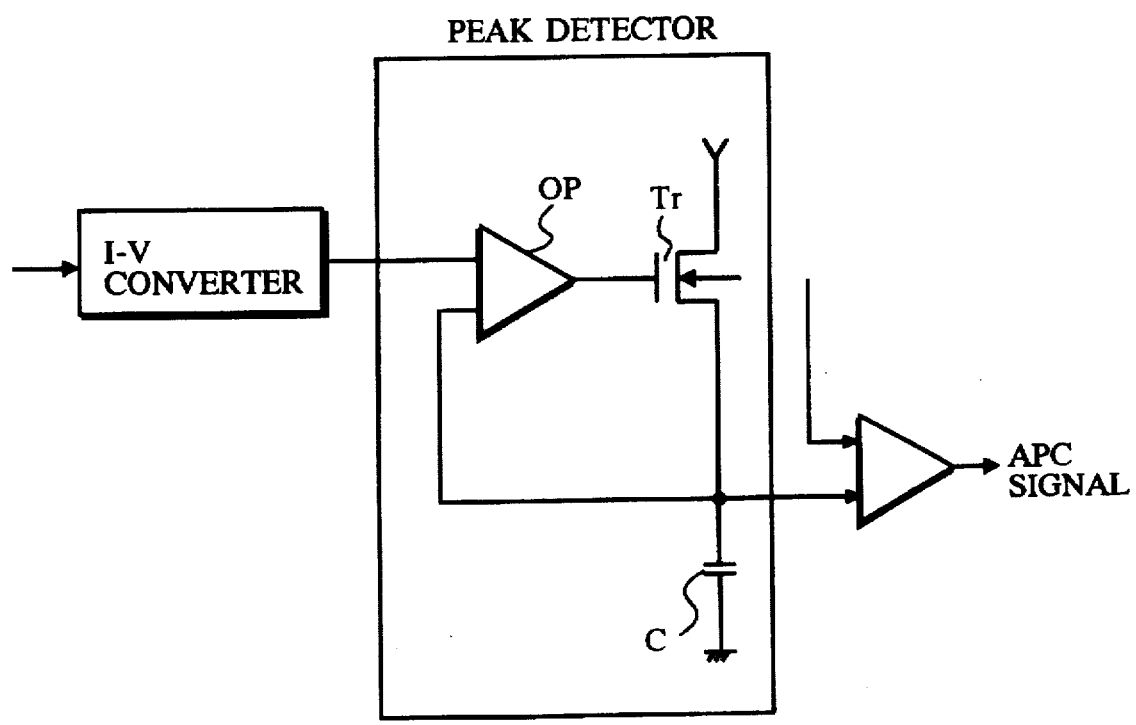
FIG. 6 is a circuit diagram showing an example of a peak detector employed in the conventional LD control system.

FIG. 5 shows a second embodiment of the present invention, wherein circuit blocks similar to those previously described with reference to FIG. 1 are denoted by the same reference numerals. In this embodiment, the monitored voltage signal is transferred from the I–V converter 105 to the sample and hold circuit 301 which has the same circuit as the sample and hold circuit 107 as shown in FIG. 1. The output of the sample and hold circuit 301 is amplified by the amplifier 302 and then is output as the APC signal to the LD driver 102. Since the sample and hold circuit 301 receives the monitored voltage signal on the node T2 from the I–V converter 105, the controller 303 provides the delay time period Tpd1 and the pulse width control as described before to output the SW control signal to the sampling switch SW of the sample and hold circuit 301. It is apparent that the second embodiment achieves the same advantages as the first embodiment.

What is claimed is:

1. A control circuit for a light-emitting source which emits an optical signal, comprising:

monitoring means for monitoring said optical signal emitted by said light-emitting source to produce a monitored signal corresponding to said optical signal;

sampling means for sampling said monitored signal each time said light-emitting source emits light based on an input digital signal and producing a first monitored signal;

retaining means for retaining said first monitored signal to produce a control signal; and driving means for driving said light-emitting source according to said input digital signal and said control signal such that a signal component of said optical signal varies according to said input digital signal and a light intensity of said optical signal is controlled by said control signal;

said driving means comprising:

a first transistor for switching on and off according to pulses of said input digital signal; and a second transistor, which is connected in series to said first transistor, for varying in impedance according to said control signal to control said intensity of light emitted by said light-emitting source.

2. The control circuit according to claim 1, wherein said sampling means and said retaining means are formed with a sample and hold circuit, said sample and hold circuit comprising:

a sampling switch for sampling said monitored signal each time said light-emitting source emits light based on said input digital signal and producing said first monitored signal; and a capacitor for retaining said first monitored signal to produce said control signal.

3. The control circuit according to claim 1, wherein said sampling means comprises:

a sampling switch for sampling said monitored signal according to a switch control signal to produce said first monitored signal; and a pulse generator for generating said switch control signal based on said input digital signal, said switch control signal having a pulse width smaller than a pulse width of said input digital signal.

4. The control circuit according to claim 1, wherein said sampling means and said retaining means are formed with a sample and hold circuit and a pulse controller, said sample and hold circuit comprising:

a sampling switch for sampling said monitored signal according to a switch control signal to produce said first monitored signal; and a capacitor for retaining said first monitored signal to produce said control signal, and said pulse controller comprising a pulse generator for generating said switch control signal based on said input digital signal, said switch control signal having a pulse width smaller than a pulse width of said input digital signal.

5. The control circuit according to claim 1, wherein said sampling means comprises:

a delay circuit for delaying said input digital signal by a first time period to produce a delayed input digital signal, said first time period being required for said monitored signal corresponding to said input digital signal to reach said sampling means;

a sampling switch for sampling said monitored signal according to a switch control signal to produce said first monitored signal; and a pulse generator for generating said switch control signal based on said delayed input digital signal, said switch control signal having a pulse width smaller than a pulse width of said delayed input digital signal.

6. The control circuit according to claim 1, wherein the retaining means comprises a capacitor for holding said first monitored signal to produce a control voltage as the control signal; and the second transistor of the driving means is a current source transistor which varies in impedance according to said control voltage received at a gate of the second transistor to supply a driving current to the first transistor.

7. A control circuit comprising a negative-feedback loop, said negative-feedback loop comprising:

a light emitting source which emits an optical signal;

monitoring means for monitoring said optical signal emitted by said light-emitting source to produce a monitored signal corresponding to said optical signal;

sampling means for sampling said monitored signal each time said light-emitting source emits light based on an input digital signal and producing a first monitored signal;

retaining means for retaining said first monitored signal to produce a second monitored signal; and driving means for driving said light-emitting source according to said input digital signal and said second monitored signal such that a signal component of said optical signal varies according to said input digital signal and a light intensity of said optical signal is controlled by said second monitored signal so as to be kept at a predetermined level;

said driving means comprising:

a first transistor for switching on and off according to pulses of said input digital signal; and a second transistor, which is connected in series to said first transistor, for varying in impedance according to said second monitor signal to control said intensity of light emitted by said light-emitting source.

8. The control circuit according to claim 7, wherein said sampling means and said retaining means are formed with a sample and hold circuit, said sample and hold circuit comprising:
- a sampling switch for sampling said monitored signal each time said light-emitting source emits light based on said input digital signal and producing said first monitored signal; and
- a capacitor for retaining said first monitored signal to produce said second monitored signal.

9. The control circuit according to claim 7, wherein said sampling means comprises:
- a sampling switch for sampling said monitored signal according to a switch control signal to produce said first monitored signal; and
- a pulse generator for generating said switch control signal based on said input digital signal, said switch control signal having a pulse width smaller than a pulse width of said input digital signal.

10. The control circuit according to claim 7, wherein said sampling means and said retaining means are formed with a sample and hold circuit and a pulse controller, said sample and hold circuit comprising:
- a sampling switch for sampling said monitored signal according to a switch control signal to produce said first monitored signal; and
- a capacitor for retaining said first monitored signal to produce said second monitored signal, and
- said pulse controller comprising a pulse generator for generating said switch control signal based on said input digital signal, said switch control signal having a pulse width smaller than a pulse width of said input digital signal.

11. The control circuit according to claim 7, wherein said negative-feedback loop further comprises:
- a negative-feedback amplifier for amplifying said monitored signal received from said monitoring means and outputting said monitored signal amplified to said sampling means.

12. The control circuit according to claim 7, wherein said negative-feedback loop further comprises:
- a negative-feedback amplifier for amplifying said second monitored signal received from said retaining means and outputting said second monitored signal amplified as said second monitored signal voltage to said driving means.

13. A control circuit comprising a negative-feedback loop, said negative-feedback loop comprising:
- a light emitting source which emits an optical signal;
- monitoring means for monitoring said optical signal emitted by said light-emitting source to produce a monitored signal corresponding to said optical signal;
- sampling means for sampling said monitored signal each time said light-emitting source emits light based on an input digital signal and producing a first monitored signal;
- retaining means for retaining said first monitored signal to produce a second monitored signal; and
- driving means for driving said light-emitting source according to said input digital signal and said second monitored signal such that a signal component of said optical signal varies according to said input digital signal and a light intensity of said optical signal is controlled by said second monitored signal so as to be kept at a predetermined level;
- said sampling means and said retaining means being formed with a sample and hold circuit and a pulse controller, wherein said sample and hold circuit comprises:
  - a sampling switch for sampling said monitored signal according to a switch control signal to produce said first monitored signal; and
  - a capacitor for retaining said first monitored signal to produce said second monitor signal, and
- said pulse controller comprises:
  - a delay circuit for delaying said input digital signal by a first time period to produce a delayed input digital signal, said first time period being required for said monitored signal corresponding to said input digital signal to reach said sampling means; and
  - a pulse generator for generating said switch control signal based on said delayed input digital signal, said switch control signal having a pulse width smaller than a pulse width of said delayed input digital signal.

14. An automatic power controller comprising a negative-feedback loop, said negative-feedback loop comprising:
- a laser source which emits an optical signal, a light intensity of said optical signal being adjusted by a drive current passing through said laser source;
- a photodetector for detecting a monitored signal from said optical signal emitted by said laser source, said monitored signal corresponding to said optical signal;
- a sampling circuit for sampling said monitored signal each time said laser source emits light based on an input digital signal and producing a first monitored signal;
- a holding circuit for holding said first monitored signal to produce a control voltage; and
- a laser driver for supplying said drive current to said laser source, said drive current varying according to said input digital signal and said control voltage such that said optical signal switches on and off according to said input digital signal and a light intensity of said optical signal is controlled by said control voltage so as to be kept constant;
- said laser driver comprising:
  - a first transistor for switching on and off according to pulses of said input digital signal; and
  - a second transistor, which is connected in series to said first transistor, for varying in impedance according to said control voltage to control said intensity of light emitted by said laser source.

15. An automatic power controller comprising a negative-feedback loop, said negative-feedback loop comprising:
- a laser source which emits an optical signal, a light intensity of said optical signal being adjusted by a drive current passing through said laser source;
- a photodetector for detecting a monitored signal from said optical signal emitted by said laser source, said monitored signal corresponding to said optical signal;
- a sampling circuit for sampling said monitored signal each time said laser source emits light based on an input digital signal and producing a first monitored signal;
- a holding circuit for holding said first monitored signal to produce a control voltage; and
- a laser driver for supplying said drive current to said laser source, said drive current varying according to said input digital signal and said control voltage such that said optical signal switches on and off according to said input digital signal and a light intensity of said optical signal is controlled by said control voltage so as to be kept constant;

said sampling circuit and said holding circuit being formed with a sample and hold circuit and a pulse controller, wherein said sample and hold circuit comprises:

a sampling switch for sampling said monitored signal according to a switch control signal to produce said first monitored signal, and a capacitor for retaining said first monitored signal to produce said control voltage; and said pulse controller comprises a pulse generator for generating said switch control signal based on said input digital signal, said switch control signal having a pulse width smaller than a pulse width of said input digital signal.

16. An automatic power controller to comprising a negative-feedback loop, said negative-feedback loop comprising:

a laser source which emits an optical signal, a light intensity of said optical signal being adjusted by a drive current passing through said laser source;

a photodetector for detecting a monitored signal from said optical signal emitted by said laser source, said monitored signal corresponding to said optical signal;

a sampling circuit for sampling said monitored signal each time said laser source emits light based on an input digital signal and producing a first monitored signal;

a holding circuit for holding said first monitored signal to produce a control voltage; and a laser driver for supplying said drive current to said laser source, said drive current varying according to said input digital signal and said control voltage such that said optical signal switches on and off according to said input digital signal and a light intensity of said optical signal is controlled by said control voltage so as to be kept constant;

said sampling circuit and said holding circuit being formed with a sample and hold circuit and a pulse controller, said sample and hold circuit comprising:

a sampling switch for sampling said monitored signal according to a switch control signal to produce said first monitored signal; and a capacitor for retaining said first monitored signal to produce said control voltage, and said pulse controller comprising:

a delay circuit for delaying said input digital signal by a first time period to produce a delayed input digital signal, said first time period being required for said monitored signal corresponding to said input digital signal to reach said sampling circuit; and a pulse generator for generating said switch control signal based on said delayed input digital signal, said switch control signal having a pulse width smaller than a pulse width of said input digital signal.

17. A control circuit for a light-emitting source which emits an optical signal, comprising:

monitoring means for monitoring said optical signal emitted by said light-emitting source to produce a monitored signal corresponding to said optical signal;

sampling means for sampling said monitored signal each time said light-emitting source emits light based on an input digital signal and producing a first monitored signal;

retaining means for retaining said first monitored signal to produce a control signal; and driving means for driving said light-emitting source according to said input digital signal and said control signal; such that a signal component of said optical signal varies according to said input digital signal and a light intensity of said optical signal is controlled by said control signal;

said sampling means and said retaining means being formed with a sample and hold circuit and a pulse controller, wherein said sample and hold circuit comprises:

a sampling switch for sampling said monitored signal according to a switch control signal to produce said first monitored signal; and a capacitor for retaining said first monitored signal to produce said control signal, and said pulse controller comprises:

a delay circuit for delaying said input digital signal by a first time period to produce a delayed input digital signal, said first time period being required for said monitored signal corresponding to said input digital signal to reach said sampling means; and a pulse generator for generating said switch control signal based on said delayed input digital signal, said switch control signal having a pulse width smaller than a pulse width of said delayed input digital signal.

18. A control method for a light-emitting source which emits an optical signal, comprising the steps of:

monitoring said optical signal emitted by said light-emitting source to produce a monitored signal corresponding to said optical signal;

generating a switch control signal based on an input digital signal, said switch control signal having a pulse width smaller than a pulse width of said input digital signal;

sampling said monitored signal each time said light-emitting source emits light based on said input digital signal and producing a first monitored signal;

retaining said first monitored signal to produce a control signal; and driving said light-emitting source according to said input digital signal and said control signal such that a signal component of said optical signal varies according to said input digital signal and a light intensity of said optical signal is controlled by said control signal.

19. The control method according to claim 18 further comprising, prior to the generating step, delaying said input digital signal by a first time period to produce a delayed input digital signal, for use in the generating step to generate said switch control signal based on said delayed input digital signal, instead of said input digital signal, said first time period being required for said monitored signal to be sampled in the sampling step at a desired time.

* * * * *